No. 683,128. Patented Sept. 24, 1901.
A. D. LUGIBIHL & H. KIBELE.
CREAM SEPARATOR.
(Application filed Apr. 1, 1901.)
(No Model.)
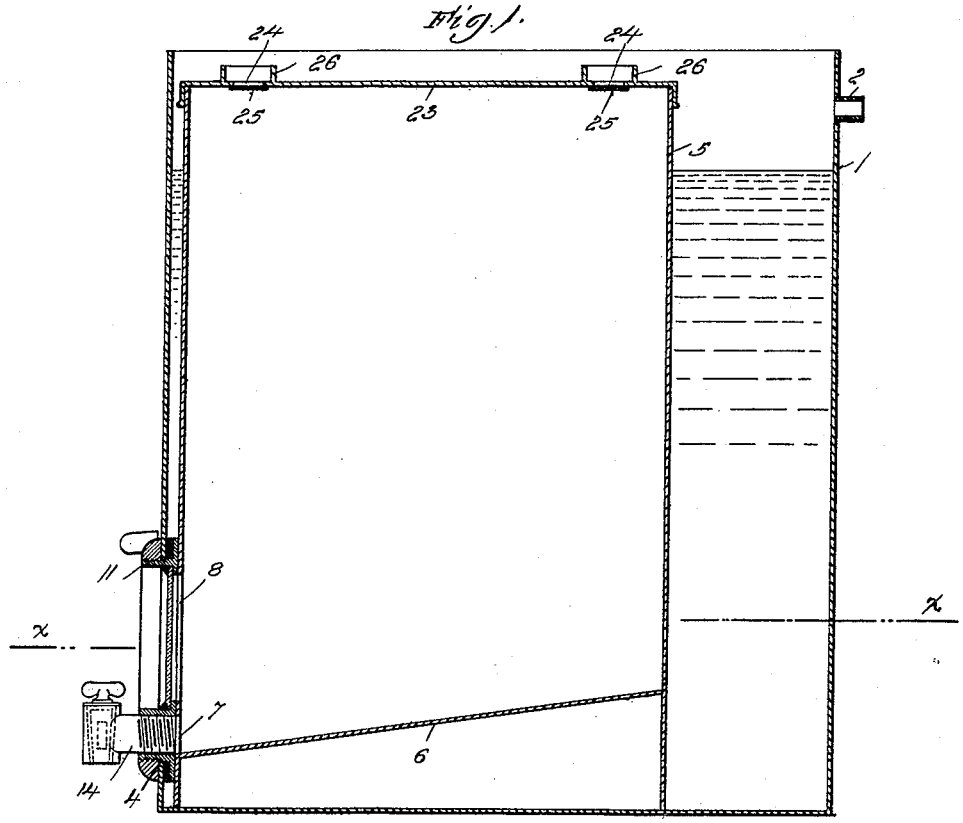
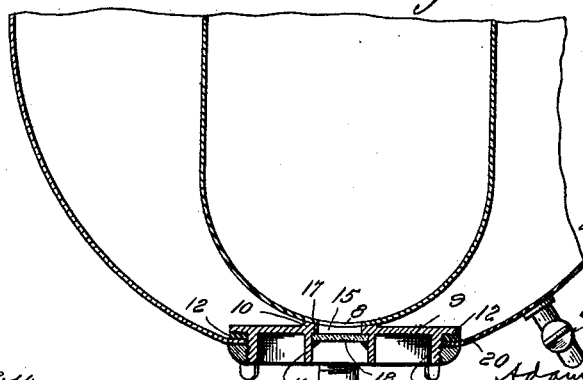
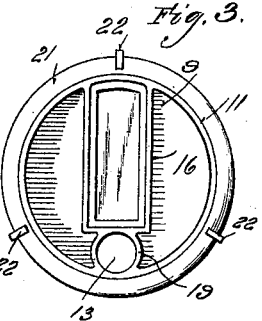

UNITED STATES PATENT OFFICE.

ADAM D. LUGIBIHL AND HECTOR KIBELE, OF BLUFFTON, OHIO.

CREAM-SEPARATOR.

SPECIFICATION forming part of Letters Patent No. 683,128, dated September 24, 1901.

Application filed April 1, 1901. Serial No. 53,839. (No model.)

*To all whom it may concern:*

Be it known that we, ADAM D. LUGIBIHL and HECTOR KIBELE, citizens of the United States, residing at Bluffton, in the county of Allen and State of Ohio, have invented certain new and useful Improvements in Cream-Separators, of which the following is a specification, reference being had therein to the accompanying drawings.

This invention relates to cream-separators, and more particularly to that class in which an outer vessel containing water is employed in connection with an inner vessel containing the milk and cream, and has for its object to provide a construction whereby the two cans may be readily connected in such a way as to permit the milk or cream to be drawn from the inner vessel and allow inspection of the contents thereof, while at the same time the two vessels may be readily disconnected when desired.

To these and other ends our invention consists in certain novel features, which we will now proceed to describe and will then particularly point out in the claims.

In the accompanying drawings, Figure 1 is a central vertical section of a structure embodying our invention in one form. Fig. 2 is a partial plan section taken on the line $x\,x$ of Fig. 1; and Fig. 3 is a detail view of the combined coupling, faucet-socket, and window-frame.

Referring to said drawings, 1 indicates the outer or water vessel, preferably cylindrical in form and constructed of galvanized iron. This outer vessel is provided with the usual overflow-pipe 2 near its top and with the usual drainage-faucet 3 near its bottom. Said outer vessel is also provided with an opening 4 near its bottom for the purpose hereinafter set forth.

5 indicates the inner vessel for containing the milk and cream. This vessel is preferably constructed of sheet metal—such as tin-plate—oblong in shape, and is provided with a sloping bottom 6, at the lower end of which there is formed in the inner vessel a discharge-opening 7. Above this discharge-opening there is formed through the wall of the inner vessel a vertically-extended sight-opening 8.

9 indicates a disk-shaped coupling having on its rear or inner face a rib 10, the surface of which is curved to conform to the curvature of the body of the inner vessel 5, and to which it is adapted to be secured by soldering or otherwise. This disk has on its outer face an annular rib 11, standing at right angles to the body of the disk, or, in other words, projecting outward therefrom and threaded on its outer surface. This threaded annular rib stands back some little distance from the margin of the disk, thereby leaving between said rib and margin a shoulder 12 for the purpose hereinafter set forth. Within the annular rib 11 there is formed in the disk an opening 13, circular in cross-section and threaded to receive a faucet 14, said opening 13 registering with the outlet-opening 7 of the inner vessel. Immediately above the opening 13 there is formed in the body of the disk within the annular rib 11 a sight-opening 15, surrounded on the outer face of the disk at a short distance from its margin by a rib or flange 16, there being thus formed between said rib or flange and the sight-opening proper a shoulder 17, against which rests a glass or other transparent medium 18, held in position so as to make a fluid-tight joint in any suitable manner. The threaded faucet-hole 13 is also surrounded by a flange, (indicated at 19,) and the flanges 16 and 19 are preferably of the same height as the annular rib 11. The annular rib 11 is of such external diameter as to pass through the opening 4 in the outer vessel, and an annular washer or gasket 20, of rubber or the like, is seated upon the shoulder 12 between the body of the vessel 1 and said shoulder. The annular rib 11 projects outward beyond the exterior of the outer vessel 1, and said projecting portion receives a threaded annulus or ring-nut 21, which fits thereon and which may be screwed down tight, so as to clamp the body of the external vessel firmly between said threaded annulus or ring-nut and the washer 20, so as to make a fluid-tight joint. The threaded annulus 21 is provided with projections 22, preferably three in number, suitably spaced thereon, so as to permit said threaded annulus to be readily grasped and rotated. The faucet 14 is preferably of such a size as to not extend beyond the outer periphery of the annular rib 11.

The inner vessel 5 is preferably provided with a lid or cover 23, having openings therein, as indicated at 24, for purposes of ventilation, these openings being provided with screens 25, of wire-cloth or the like, and surrounded by annular projections or collars 26. These collars protect the screens from injury and are adapted to receive closures, if desired. The cover may be inverted and used as a strainer, in which case the collars 26 serve as discharge-pipes for the strained fluid.

It will be observed that the inner and outer vessels may be readily connected by inserting the annular rib 11 through the opening 4 in the outer vessel and screwing up tight the ring-nut or threaded annulus 21. When the parts are in this position, the milk may be drained off, as desired, leaving the cream within the inner vessel, and the progress of this operation may be observed through the sight-opening. The faucet-opening is so located in conjunction with the inclined bottom that all of the cream may be drawn off, and the sight-opening is so located relatively to the faucet-opening that the level of the contents of the inner vessel may be observed up to the discharge of the very last portion thereof. The arrangement of these sight-openings relatively to each other and to the annular rib 11 is one which gives superior compactness and effectually protects the openings, at the same time causing a single opening in the outer vessel to accommodate both the faucet and sight openings of the inner vessel. The two vessels may be readily disconnected by unscrewing the ring-nut or threaded annulus 21. This effects a complete disconnection of the vessels, and the inner vessel may then be drawn back until the faucet is within the outer vessel and then removed by being lifted up. The faucet forms no part of the connecting device of the two cans, and no part of the connecting device is secured to the outer can.

Having thus fully described our invention, what we claim as new, and desire to secure by Letters Patent, is—

1. A cream-separator comprising, in combination, an outer sheet-metal vessel provided with an opening, an inner sheet-metal vessel provided with a sight-opening, and a discharge-opening immediately below the same, a disk-shaped coupling having a threaded annular rib surrounded externally by a shoulder and provided within said rib with a threaded faucet-opening at the bottom, and a vertically-extending sight-opening immediately above the same, said annular rib extending through the opening in the outer vessel, a washer located between the shoulder of the disk-shaped coupling and the body of the outer vessel, and a threaded annulus or ring-nut mounted on the threaded annular rib externally of the outer vessel and adapted to clamp the same against the washer, a transparent medium closing the sight-opening, and a faucet screwing into the faucet-opening, said disk-shaped coupling being permanently secured to the inner vessel, with its sight and faucet openings registering with the sight and discharge openings thereof, substantially as described.

2. A cream-separator comprising, in combination, an outer sheet-metal vessel provided with an opening, an inner sheet-metal vessel having an inclined bottom, a discharge-opening at the lower end thereof, and a vertically-extending sight-opening immediately above said discharge-opening, a disk-shaped coupling secured to said inner vessel and having a threaded annular rib surrounded externally by a shoulder and provided within said rib with a threaded faucet-opening registering with the discharge-opening of the inner vessel, and a vertically-extending sight-opening immediately above the same registering with the sight-opening of the inner vessel and closed by a transparent medium, a faucet screwing into said faucet-opening and lying within the outer periphery of the annular rib, said annular rib extending through the opening in the outer vessel, a washer located between the shoulder of the disk-shaped coupling and the body of the outer vessel, and a threaded annulus or ring provided with projections and mounted on the threaded annular rib externally of the outer vessel and adapted to clamp the same against the washer, substantially as described.

In testimony whereof we affix our signatures in presence of two witnesses.

ADAM D. LUGIBIHL.
HECTOR KIBELE.

Witnesses:
FRANK A. EATON,
IRA TROXEL.